US010751837B2

(12) United States Patent
Garcia et al.

(10) Patent No.: US 10,751,837 B2
(45) Date of Patent: Aug. 25, 2020

(54) REINFORCED STRUCTURAL COMPONENTS

(71) Applicant: AUTOTECH ENGINEERING, S.L., Amorebieta-etxano (ES)

(72) Inventors: Michel Garcia, Sitges (ES); Laura Galceran Oms, Canet de Mar (ES)

(73) Assignee: Autotech Engineering A.I.E., Amorebieta-Etxano (ES)

(*) Notice: Subject to any disclaimer, the term of this patent is extended or adjusted under 35 U.S.C. 154(b) by 231 days.

(21) Appl. No.: 15/742,231

(22) PCT Filed: Aug. 3, 2016

(86) PCT No.: PCT/EP2016/068522
§ 371 (c)(1),
(2) Date: Jan. 5, 2018

(87) PCT Pub. No.: WO2017/021440
PCT Pub. Date: Feb. 9, 2017

(65) Prior Publication Data
US 2018/0200836 A1    Jul. 19, 2018

(30) Foreign Application Priority Data
Aug. 4, 2015 (EP) .................................... 15382415

(51) Int. Cl.
*B23K 26/342* (2014.01)
*B23K 26/144* (2014.01)
(Continued)

(52) U.S. Cl.
CPC .............. *B23K 26/342* (2015.10); *B22F 7/08* (2013.01); *B23K 26/034* (2013.01);
(Continued)

(58) Field of Classification Search
CPC .. B23K 26/342; B23K 26/144; B23K 26/703; B23K 26/034; B23K 26/34;
(Continued)

(56) References Cited

U.S. PATENT DOCUMENTS 5,224,997 A * 7/1993 Grilloud ................. C23C 26/02
118/641
2004/0222198 A1 * 11/2004 Kim ..................... B23K 9/0026
219/121.11
(Continued)

FOREIGN PATENT DOCUMENTS

EP      1 621 439 A1     2/2006
EP       1621439 A1 *    2/2006 ........... B23K 26/342
(Continued)

OTHER PUBLICATIONS

KR20020031709A translation—Google Patents (Year: 2002).*
(Continued)

*Primary Examiner* — Anthony J Zimmer
*Assistant Examiner* — Ricardo D Morales
(74) *Attorney, Agent, or Firm* — Finnegan, Henderson, Farabow, Garrett & Dunner LLP (57) ABSTRACT

A method for manufacturing reinforced steel structural components is described. The method comprises providing a previously formed steel structural component, selecting one or more reinforcement zones of the previously formed structural component, and locally depositing a material on the reinforcement zone to create a local reinforcement on a first side of the structural component. Locally depositing a material on the reinforcement zone comprises supplying a metal filler material to the reinforcement zone, and substantially simultaneously applying laser heat to melt the metal filler material and create the reinforcement by drawing specific geometric shapes on the first side of the structural (Continued)

component with the metal filler material and the laser heating. And the method further comprises providing cooling to areas on an opposite side of the structural component. The disclosure further relates to a tool for manufacturing reinforced steel structural components and to the components obtained using such methods.

13 Claims, 5 Drawing Sheets

(51) Int. Cl.
| | | |
|---|---|---|
| *B23K 26/70* | (2014.01) | |
| *B62D 29/00* | (2006.01) | |
| *C21D 1/673* | (2006.01) | |
| *B22F 7/08* | (2006.01) | |
| *B23K 26/34* | (2014.01) | |
| *B33Y 10/00* | (2015.01) | |
| *B33Y 30/00* | (2015.01) | |
| *B33Y 40/00* | (2020.01) | |
| *B33Y 70/00* | (2020.01) | |
| *B33Y 80/00* | (2015.01) | |
| *B23K 26/03* | (2006.01) | |
| *B23K 103/04* | (2006.01) | |

(52) U.S. Cl.
CPC ............ *B23K 26/144* (2015.10); *B23K 26/34* (2013.01); *B23K 26/703* (2015.10); *B33Y 10/00* (2014.12); *B33Y 30/00* (2014.12); *B33Y 40/00* (2014.12); *B33Y 70/00* (2014.12); *B33Y 80/00* (2014.12); *B62D 29/007* (2013.01); *C21D 1/673* (2013.01); *B22F 2999/00* (2013.01); *B23K 2103/04* (2018.08); *C21D 2211/008* (2013.01); *C21D 2221/00* (2013.01); *C21D 2251/00* (2013.01); *Y02P 10/295* (2015.11)

(58) Field of Classification Search
CPC .... B23K 2103/04; B33Y 10/00; B33Y 30/00; B33Y 40/00; B33Y 70/00; B33Y 80/00; B62D 29/007; Y02P 10/295; B22F 2999/00; B22F 7/08; C21D 2211/008; C21D 2221/00; C21D 2251/00; C21D 1/673

See application file for complete search history.

(56) References Cited

U.S. PATENT DOCUMENTS

| | | | |
|---|---|---|---|
| 2006/0065650 | A1 | 3/2006 | Guo |
| 2010/0269962 | A1* | 10/2010 | Im .......................... B21D 35/00 148/645 |
| 2015/0027993 | A1* | 1/2015 | Bruck ................... B23K 25/00 219/73.2 |
| 2015/0211086 | A1* | 7/2015 | Im ........................... C21D 1/09 428/653 |

FOREIGN PATENT DOCUMENTS

| | | | |
|---|---|---|---|
| EP | 2 511 037 A1 | | 10/2012 |
| JP | 2013-189173 A | | 9/2013 |
| KR | 20020031709 A | * | 5/2002 |
| KR | 2011-0067981 A | | 6/2011 |
| WO | 2015/106455 | | 7/2015 |

OTHER PUBLICATIONS

EP1621439A1 translation—ESPACENET (Year: 2006).*
International Search Report and Written Opinion of the International Searching Authority for corresponding International Patent Application No. PCT/EP2016/068522 dated Oct. 31, 2016, 13 pages.

* cited by examiner

REINFORCED STRUCTURAL COMPONENTS

This application is a National Stage Application of PCT/EP2016/068522 filed on Aug. 3, 2016, which claims the benefit of European Patent Application EP15382415.6 filed on Aug. 4, 2015 and which application are incorporated herein by reference. To the extent appropriate, a claim of priority is made to each of the above disclosed applications.

The present disclosure relates to methods and tools for manufacturing reinforced structural components and to the structural components obtained through these methods.

BACKGROUND

The demand for weight reduction in e.g. the automotive industry has led to the development and implementation of lightweight materials, and related manufacturing processes and tools. The growing concern for occupant safety also leads to the adoption of materials which improve the integrity of the vehicle during a crash while also improving the energy absorption.

In that sense, vehicle parts made of high-strength and ultra-high-strength steel (UHSS) are often employed in order to satisfy criteria for lightweight construction.

A process known as Hot Forming Die Quenching (HFDQ) uses boron steel sheets to create stamped components with ultra-high-strength steel properties, with tensile strengths of e.g. 1,500 MPa or 2,000 MPa or even more. The increase in strength allows for a thinner gauge material to be used, which results in weight savings over conventionally cold stamped mild steel components.

Some of these steels, such as e.g. 22MnB5 steel, are designed to attain a microstructure after heat treatment, which confers good mechanical properties. 22MnB5 is sometimes presented with an aluminum-silicon coating and is known as Usibor® 1500P, commercially available from Arcelor Mittal. It is an example of a steel used in various components, possibly involving so-called tailored and patchwork blanks. Usibor® 1500P is supplied in ferritic-perlitic phase. It is a fine grain structure distributed in a homogenous pattern. The mechanical properties are related to this structure. After heat treatment during a hot forming process, a martensite microstructure is created. As a result, maximum tensile strength and yield strength increase noticeably.

Typical vehicle components that may be manufactured using the HFDQ process include: door beams, bumper beams, cross/side members, NB pillar reinforcements, and waist rail reinforcements.

Simulations performed during the design phase of a typical vehicle component can identify points or zones of the formed component that need reinforcement (because lighter and thinner metal sheets and blanks are used) in order to increase strength and/or stiffness. Alternatively a redesign may be done in order to obtain a desired deformation behaviour.

In that sense, there are several procedures with which some areas of a component can be reinforced or weakened in order to redistribute stress and save weight by reducing the thickness of the component. These known procedures for reinforcing a component are, for example, procedures adding welded reinforcements prior to any forming process. Such reinforcements may be "patchworks" in which partial or complete overlapping of several blanks may be used, or blanks or plates of different thickness that may be welded "edge to edge", i.e. Tailor welded blanks (TWB). Structural mechanical requirements can thus be achieved theoretically with a minimum of material and thickness, i.e. weight.

In these methods however, further manufacturing processes are involved. Additionally, when ultra-high strength steels are being hot formed some weldability problems may arise due to an aluminum-silicon (AlSi) coating usually used to protect from corrosion and oxidation damage. In order to overcome these problems it is known to remove a part of the coating in an area close to the welding gap by laser ablation. However, this represents yet an additional step in the manufacturing process of a vehicle component.

Furthermore, when welded reinforcements (patchworks) are added to a blank, partial or complete overlapping of blanks occur. These areas are potential corrosion starting points as overlapped regions remain underneath and do not receive e.g. a corrosion coating.

In addition, depending on the component being formed there may be regions in which it is not possible or it is at least cumbersome to use welded reinforcements e.g. corners or areas with elevation changes. Patchworks are normally welded using a spot welding which requires a minimum space to distribute the spots. Additionally, patchworks need a minimum size in order to be easily welded. This may involve an extra weight as the reinforcement needs to have a minimum size in order to be welded rather than having the right size (minimum) needed to reinforce the required area.

Document EP1621439 describes methods of forming a weld type metallic surfacing in a zone on at least one side of a thin metallic structure by laser beam. However, boundary areas of such a metallic surfacing may involve locally lower cooling rates than that at the surfacing area thus resulting in weaker points/zones.

The aforementioned problems and/or challenges are not unique to the automotive industry or to the materials and processes used in that industry. Instead these challenges may be encountered in any industry wherein weight reduction is an objective. When weight reduction is an objective, the components become ever thinner which can thus lead to an increased need for reinforcements.

It is an object of the present disclosure to provide improved methods of manufacturing reinforced structural components.

SUMMARY

In a first aspect, a method for manufacturing reinforced structural components is provided. The method comprises providing a previously formed steel structural component and selecting one or more reinforcement zones of the previously formed structural component. The method further comprises locally depositing a material on the reinforcement zone to create a local reinforcement on a first side of the structural component, wherein locally depositing a material on the reinforcement zone comprises supplying a metal filler material to the reinforcement zone, and substantially simultaneously applying laser heat to melt the metal filler material and create the reinforcement by drawing specific geometric shapes on the first side of the structural component with the metal filler material and the laser heating. And the method further comprises providing cooling to areas on a second side of the structural component that is opposite to the first side.

Throughout the present description and claims heat-affected zones (HAZ) of the reinforcement zone should be understood as boundary areas of the structural component abutting or being contiguous with or adjacent to a reinforcement zone. I.e., areas of the structural component that receive less heat than that received by the reinforcement zone and which are not melted but have had their microstructure and properties altered by welding or other intensive heat operation. This includes, for example, areas next to the reinforcement zone in both transversally and longitudinally directions in a horizontal plane and/or in a vertical plane. For example, in case of structural components that are relatively thick such that the side of the structural component that is opposite to the side being reinforced does not receive as much heat as the side on which the reinforcement is applied. In an example, such components may have a thickness of approximately more than 1.6 mm or higher. Other parameters may alter the HAZ, e.g. the speed at which the laser is applied to the reinforcement zone among others. In case that the laser is passed over a surface relatively rapidly, the phenomenon described here of the HAZ may also occur in thinner components or blanks. Throughout the present disclosure the heat-affected zones are also called boundary areas.

According to this aspect, a reinforced structural steel component is obtained by applying a weld cladding process, i.e. by applying a metal filler material and simultaneously applying laser heating so as to tailor-made reinforcements on one side of a previously formed component. By using weld cladding no extra weight is added with the reinforcement as material is only added in those specific areas needing reinforce.

Since the reinforcement is added on one side of the component by applying heat in the order of around 1200° C. (laser heating) to the specific zone to be reinforced, the heat will extend to the areas adjacent to the specific zone to be reinforced. Similarly, in some examples, the laser spot may be slightly bigger than the width of the reinforcement. The areas adjacent to the spot will also receive heat.

However, the boundary areas do not directly receive the laser beam and thus receive less heat than that received by the specific zone to be reinforced or than that covered by the laser spot. A temperature difference with ambient temperature at the boundary areas is thus lower than a temperature difference at the zone receiving laser heat directly. This means that there will be a lower cooling rate locally at the boundary areas.

In some cases, the heat reaching the boundary areas may not be enough, i.e. not reaching Ac1 or Ac3 temperature, to obtain austenite. Cooling down from a lower temperature also affects (slows down) the cooling rate.

Since the rate at which the steel is cooled directly affects its resulting mechanical properties, the boundary areas could thus result in areas of the reinforced steel structural component having reduced mechanical properties, i.e. areas having a resulting microstructure comprising martensite-bainite and ferrite or even pearlite-ferrite matrix microstructures. Cooling down from a lower temperature than Ac3 naturally also affects the obtained microstructure.

The provision of cooling to areas on an opposite side of the structural component guarantees that the heated-affected areas also achieve a cooling rate that is high enough to substantially obtain a martensite microstructure or at least substantially reduces the formation of ferrite matrix microstructures in the final reinforced component. Also, the provision of cooling can reduce the heat affected areas in that the areas do not reach high temperatures which can negatively affect the microstructure.

In some examples, the local reinforcement may have a minimum thickness of 0.2 mm. In further examples, the local reinforcement may have a thickness of 0.2 mm-10 mm. Inventors have found that increasing the thickness of the blank reduce the heat-affected zone at least on laterals.

The local reinforcement thickness ensures the provision of increased mechanical strength of the component in the reinforcement zone. In further examples, the thickness of the reinforcement (i.e. the increase of the thickness with respect to the component) may be from 0.2 to 6 mm, and in particular from 0.2 to 2 mm. The thickness of the reinforcement zone will generally be determined taking into account the thickness of the blank used to form the component.

In some examples, the formed steel component may have a thickness in the range of 0.7 mm to 5 mm. This means that the steel component may be substantially thin and may be formed by a relatively simple deformation process, e.g. hot stamped or hot formed in a press, formed in roll forming, etc. Using the method described herein, i.e. supplying a metal filler material while substantially simultaneously applying laser heat the thickness of the structural component can be maintained substantially thin but its strength or structural properties in specific areas (reinforcement zone) is increased while maintaining substantially similar mechanical properties at the HAZ areas adjacent the reinforced specific areas. Mechanical properties of the final reinforced components are thus enhanced while its weight is minimized.

In more examples, a thickness ratio between the local reinforcement and the formed component (thickness of local reinforcement/thickness of steel structural component) may range from 50% to 300%. Inventors have found that the use of thickness ratios within this range leads to especially high strength and stiff components with a substantially low weight increase.

In some examples, providing cooling to areas on a side of the structural component that is opposite to the side being reinforced may be done by directing an air stream to the areas on an opposite side of the component from one or more air injectors or blowers. In others, it may be done by cooling elements provided in a dedicated tool. In these cases, the cooling elements may be configured to cool down at least the HAZ areas abutting the reinforcement zone. Further in these cases, the tool may have substantially the same shape as that of the structural component to be reinforced. The tool may thus also act as a support for the structural component when the reinforcement is being applied. This way, deformation of the component due to thermal stress is avoided or at least substantially reduced. Inventors have found that the use of cooling elements provided in a tool substantially as hereinbefore described leads to especially good results when reinforcing substantially thin structural components, i.e. approximately less than 5 mm. This enhances mechanical properties without adding extra weight to the final reinforced component.

In some examples, the method may further comprise determining a temperature of the heat-affected zones abutting the reinforcement zone. In these cases, providing cooling to areas on an opposite side of the structural component may be carried out as a function of the temperature reached at the heat-affected zones.

In some examples, selecting one or more reinforcement zones may comprise performing crash simulations of the previously formed structural components. This way the specific geometric shapes are created by weld cladding as a function of the deformation energy involved in the crash. In some examples, the specific geometric shapes drawn by weld cladding may further depend on the thickness of the blank used to form the component. In further examples, the reinforcement zone may be defined to compensate a loss of strength caused by holes needed e.g. for screws. In these cases the reinforcement zone may surround the holes provided in the component. In more examples, the reinforcement zone may be defined at those areas in which a hinge or a hook (e.g. tow hook of a bumper) is provided. Alternatively, the reinforcement may be drawn in order to steer deformation, i.e. to obtain a desirable deformation behaviour under a crash situation.

In some examples, the blank from which the component is formed may have substantially the same thickness. Whatever reinforcement is needed can in these cases be provided by weld cladding. No steps for obtaining a tailor welded blank or a patchwork blank would thus be needed.

In some examples, the structural component may be made from tailor blanks or patchwork blanks.

In some examples, the metal filler material may be a metal powder. And the metal powder may be delivered to the weld zone in a gas powder flow. In some of these cases, the metal powder may be a stainless steel based powder, e.g., stainless steel AlSi 316L or a composition corresponding to an Ultra High Strength Steel, such as e.g. Usibor® or a 431L HC. In some examples, powders may be used that have a similar composition as that of the material of the blank or previously formed component on which the reinforcements are to be provided. This way, the powder used has substantially similar properties to those of the steel structural component thus resulting, i.e. once melted, in a substantially homogeneous final reinforced product. In more examples, the metal powder may be 3533-10.

Alternatively, the metal filler material may be wire or rod shaped. Such a metal wire or rod may be positioned on the component or fed to a component in a location where reinforcement is needed. The heat of the laser can melt the wire or rod and the portion of the component directly underneath such that the wire or rod forms a reinforcement joined to the structural component.

In case such filler rods or filler wires are used (rather than a gas powder flow), cooling e.g. by blowing air may even be provided on the same side as the structural reinforcement. Of course cooling may also be provided on the opposite side as shown in various examples throughout the present disclosure.

The composition of the filler wire or filler rod may be generally similar to the compositions of the filler powders described in various examples of the present disclosure.

In a second aspect, the present disclosure provides a tool for manufacturing reinforced steel structural components. The tool comprises one or more working surfaces that in use face the structural component to be reinforced, wherein the structural component comprises one or more reinforcement zones. The tool further comprises cooling elements configured to cool down at least portions of an opposite side of the working surface and the cooling elements being arranged such that in use they are in correspondence with heat-affected zones abutting the reinforcement zone such that a cooling rate of the heat-affected zones can be such to obtain a martensite microstructure at the heat-affected zones abutting the reinforced structural component. And the working surface comprises one or more portions having a substantially U-shaped cross-section. In this aspect, the U-shaped cross-section permits the working surface to follow the contour of the already formed structural component to be reinforced.

In some examples, the cooling elements may comprise channels configured for circulation of a cold fluid. In more examples, cold water or any other cooling fluid or cold compressed air may be circulated through the channels to provide cooling to the heat-affected zones (boundary areas) of structural component to be reinforced.

In some examples, the cooling elements may comprise one or more air injectors or blowers configured to direct an air stream to the heat-affected zones abutting the reinforcement zone. Depending on circumstances the air injectors or blowers may be provided as a single cooling element or they may be provided in combination with channels configured for the circulation of a cold fluid.

In still a further aspect, the present disclosure provides reinforced components as obtained by or obtainable by any of the methods substantially as hereinbefore described.

Examples of the present disclosure may be used in components that have been formed in a variety of ways, including e.g. hot stamping, roll forming, and hydroforming. Examples of the present disclosure may be used in components of different materials, and in particular different steels.

BRIEF DESCRIPTION OF THE DRAWINGS

Non-limiting examples of the present disclosure will be described in the following with reference to the appended drawings, in which.

DETAILED DESCRIPTION OF EXAMPLES

Figure 1:
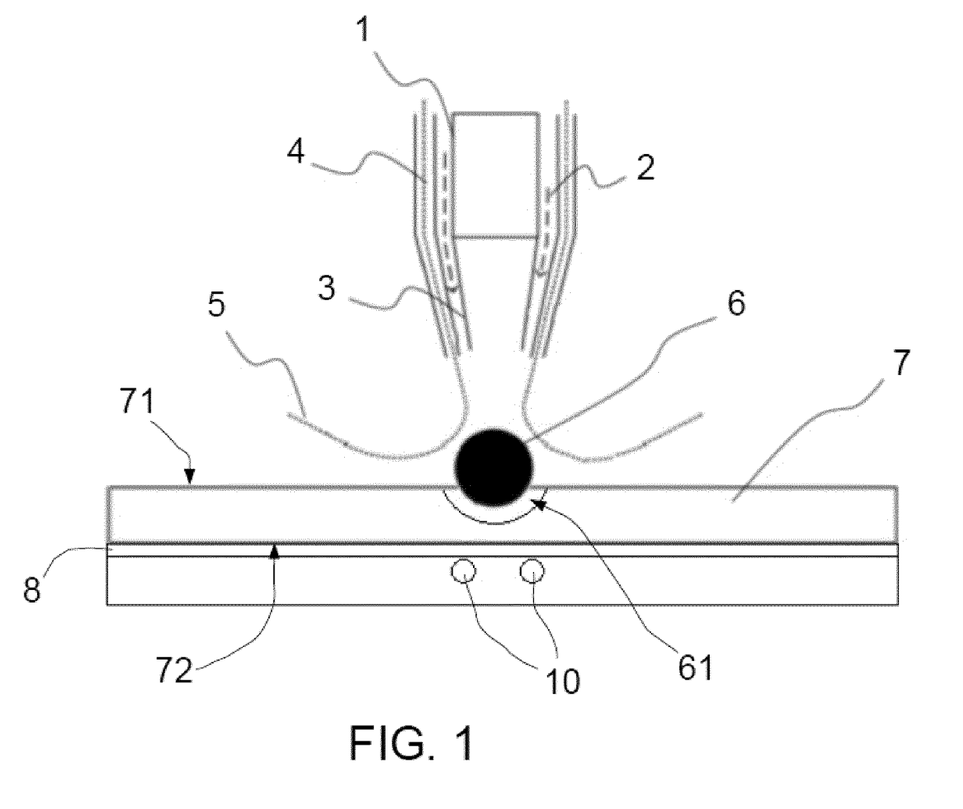
FIG. 1 schematically shows an example of applying powder, laser welding and cooling to a formed structural component.

FIG. 1 shows an example of applying a reinforcement 6 at a first surface 71 of a formed structural component 7, for example, a hot stamped component (made e.g. by HFDQ). In alternative examples, other ways of forming the component may also be foreseen such as cold forming, hydroforming or roll forming. A second surface 72 of the structural component 7 that is opposite to the first surface 71 may be provided on working surface of a tool 8. In the example of FIG. 1, the working surface is substantially flat. In alternative examples, the working surface may have other shapes depending on the shape of the formed structural component. See FIGS. 4 and 5.

In this example, a laser welder 1 may be provided. The laser welder 1 may have a laser head 3 from which a laser beam exits. A gas powder flow 2 indicated with an interrupted line with arrow may also be provided. The gas powder flow 2 may be fed in a coaxial manner with respect to the laser beam towards the zone on which the reinforcement 6 is to be formed. The gas powder flow 2 may thus be fed to the zone on which the reinforcement 6 is to be formed while the laser beam is being applied.

FIG. 1 further shows a schematic HAZ or boundary area 61 abutting the reinforcement 6. The size and shape of this area mainly depends on the power of the laser, the laser spot size, time of exposure to the laser heating, drawing patterns and/or the thickness of the formed structural component.

In these examples, a gas powder head may be coaxially arranged with respect to the laser head 3 and both heads may be arranged such that the gas powder flow 2 and the laser beam may be substantially perpendicular to the first surface of the component 71, i.e. the surface on which the reinforcement 6 is to be formed.

In alternative examples, the gas powder flow may be fed at an angle with respect to the component. In some of these examples, the gas powder flow may also be fed at an angle with respect to the laser beam or it may be coaxially arranged with respect to the laser beam as in the previous example.

In some examples, argon may be used as a transportation gas, depending on the specific implementation. Other examples of transportation gas may also be foreseen, e.g. nitrogen or helium.

As further shown in FIG. 1, optionally, a shield gas channel 4 may also be provided. In these cases, the shield gas channel 4 may be coaxially provided with respect to the laser beam to supply a shield gas flow 5 around the zone on which the reinforcement 6 is to be formed. In some examples, helium or a helium based gas may be used as a shielding gas. Alternatively an argon based gas may be used. The flow rate of the shielding gas may e.g. be varied from 1 liter/min to 15 liters/min. In further examples, no shielding gas may be required.

The laser may have a power sufficient to melt at least an outer surface (or only an outer surface) of the first surface of the component and thoroughly mixed/joined the powder throughout the entire zone on which the reinforcement 6 is to be formed.

In some examples, welding may comprise welding using a laser having a power of between 2 kW and 16 kW, optionally between 2 and 10 kW. The power of the laser should be enough to melt at least an outer surface of a formed component having a typical thickness i.e. in the range of 0.7-5 mm. By increasing the power of the welder the welding velocity may be increased.

Optionally, a Nd-YAG (Neodymium-doped yttrium aluminium garnet) laser may be used. These lasers are commercially available, and constitute a proven technology. This type of laser may also have sufficient power to melt an outer surface of a formed component and allows varying the width of the focal point of the laser and thus of the reinforcement zone. Reducing the size of the "spot" increases the energy density, whereas increasing the size of the spot enables speeding up the welding process. The weld spot may be very effectively controlled and various types of welding are possible with this type of laser.

In alternative examples, a $CO_2$ laser with sufficient power may be used. In further examples, twin spot welding may also be used.

In some cases, the powder fed to the reinforcement zone may be stainless steel AISi 316L, as commercially available from e.g. Hoganas®. The powder has the following composition in weight percentages: 0%-0.03% carbon, 2.0-3.0% of molybdenum, 10%-14% of nickel, 1.0-2.0% of manganese, 16-18% chromium, 0.0-1.0% of silicon, and the rest iron and impurities. Alternatively 431L HC, as commercially available from e.g. Hoganas® may be used. This powder has the following composition in weight percentages: 70-80% of iron, 10-20% of chromium, 1.0-9.99% of nickel, 1-10% of silicon, 1-10% of manganese and the rest impurities.

Further examples may use 3533-10, as further commercially available from e.g. Hoganas®. The powder has the following composition in weight percentages: 2.1% carbon, 1.2% of silicon, 28% of chromium, 11.5% of nickel, 5.5% of molybdenum, 1% of manganese and the rest iron and impurities.

It was found that the presence of nickel in these compositions led to good corrosion resistance. The addition of chromium and silicon aids in corrosion resistance, and molybdenum (AlSi 316L or 3533-10) aids in increasing the hardness. In alternative examples other stainless steels may also be used even UHSS. In more examples, the powder may incorporate any component providing higher or lower mechanical characteristics depending on circumstances.

As further shown in FIG. 1, channels 10 may be provided in correspondence with portions of the tool working surface 8 that may be in correspondence with the boundary area 61 abutting the reinforcement zone. The channels 10 may be provided at a side opposite to the side on which the working surface effectively receives the second surface 72 of the structural component to be reinforced 7. And the channels 10 may be configured for circulation of a cold fluid. The circulation of a cold fluid through the channels involves extra cooling to at least those portions of the working surface that are in correspondence with the boundary area 61 (HAZ). This extra cooling speeds up the cooling rate of these portions thus enhancing mechanical properties of the final reinforced component as it ensures that a martensite microstructure is also formed at the boundary area 61.

In the example of FIG. 1 two channels 10 have been depicted. However other number of channels may be foreseen or even a single channel, depending on the size of the reinforcement zone, the power of the laser, the laser spot size, time of laser exposure, drawing patterns and/or the shape and thickness of the formed structural component.

In further alternatives, instead of channels, an air stream, in particular cooled air, may be provided to the second surface 72 of the structural component. See the example of FIG. 4.

Figure 2:
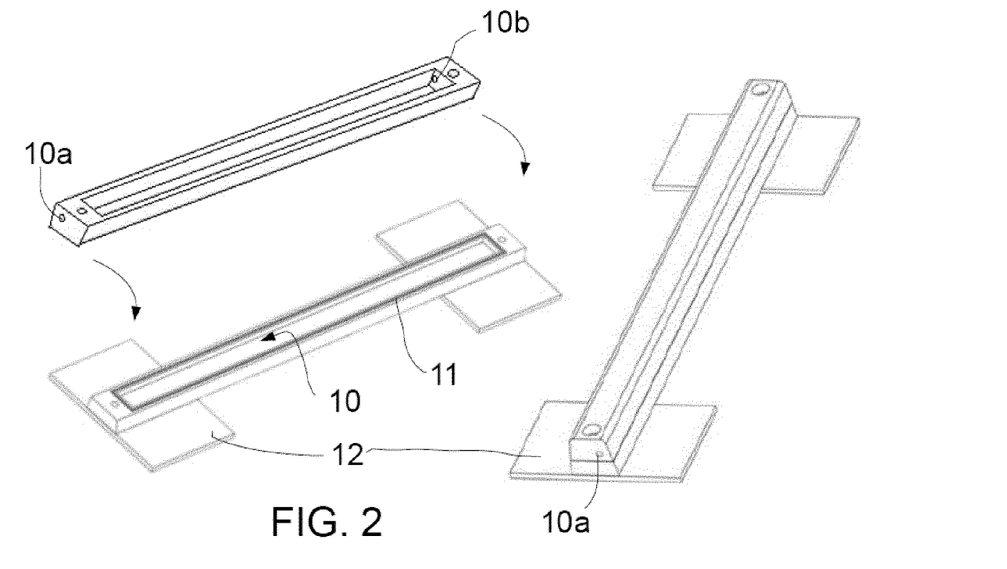
FIG. 2 shows an example of cooling elements.
Figure 3:
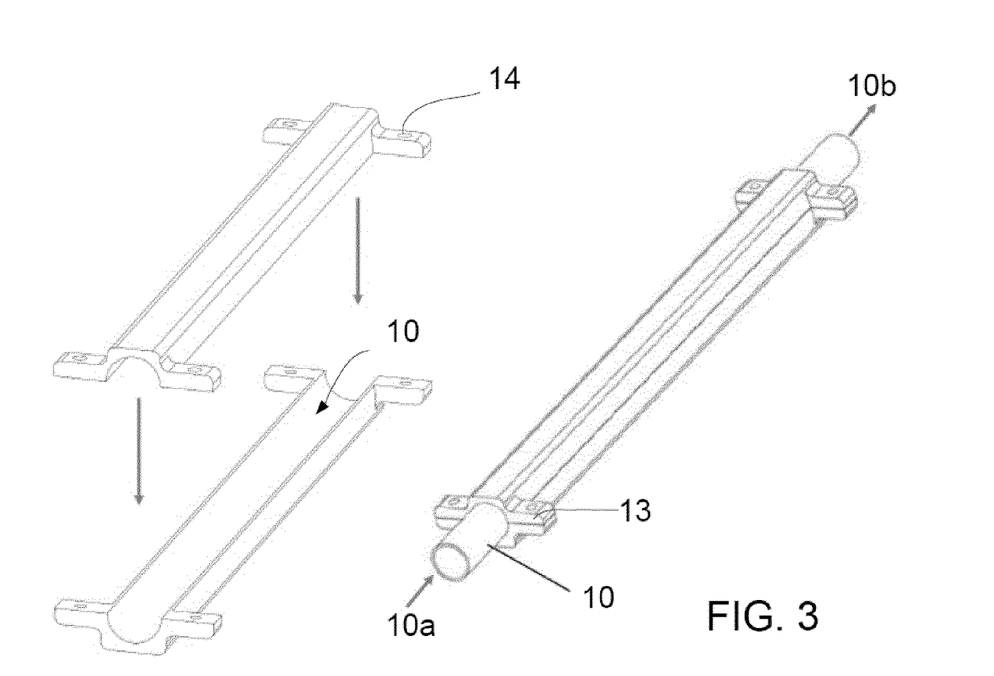
FIG. 3 shows another example of cooling elements.

FIGS. 2 and 3 show different examples of channels that may be used in the example of FIG. 1. In these figures the same reference signs have been used to designate matching elements.

In the examples of FIGS. 2 and 3, an elongate structural member may define the channel 10 that may extend substantially along the length of a reinforcement to be formed on a component. The channels 10 may be formed from two concave halves being joint together so as to define a hollow space (the channel) through which a cooling medium may circulate. To promote fluid circulation an inlet 10a and an outlet 10b may be provided at opposite ends of the channel. Cold water, cooled air or any other cooling fluid may circulate through the channels. Alternatively, the channels may be built in a single piece.

The examples of FIGS. 2 and 3 differ in the shape of their cross-section and in some constructional features that will be pointed out later on. However, these constructional features could be combined differently in more examples.

In the example of FIG. 2 the cooling channel may have a rectangular cross-section. At least one of the channels halves may be provided with an O-ring 11 or any other mechanical gasket able to be seated surrounding a groove or concavity and able of being compressed between two or more parts being put together. This guarantees sealing of the two channel's halves when the channel is being put together. The channel 10 may be fixed to a plate 12 at each end. And the plates 12 may be fixed to the working surface of the tool by e.g. screws or any other fastening means.

In the example of FIG. 3 the channel may have a circular cross-section. Clamps 13 may be provided instead of plates at the channel ends. The clamps may be machined together with the channel halves or they may be separate clamps. The clamps may serve for joining together the channel halves and for fixing the channel to the working surface. In both cases the clamps may be provided with holes 14 for screws or any other fastening means. In some cases the same fasteners used for maintaining together the channel halves may be used for fixing the channel to the working surface. Other known fasteners may be foreseen.

Figure 4:
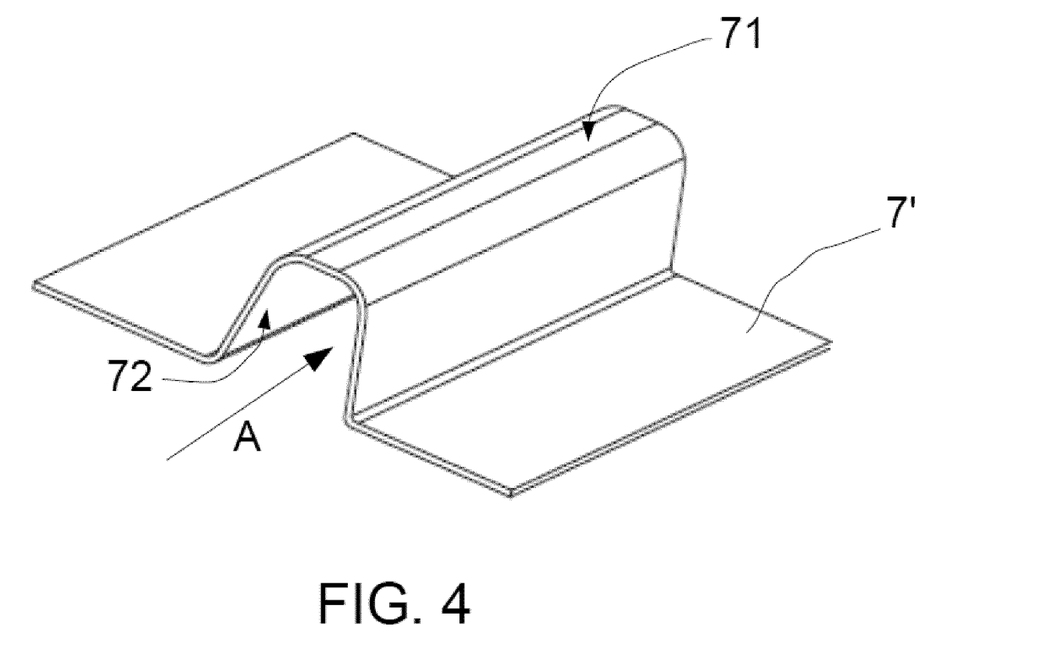
FIG. 4 shows a structural component and cooling elements according to an example.
Figure 5:
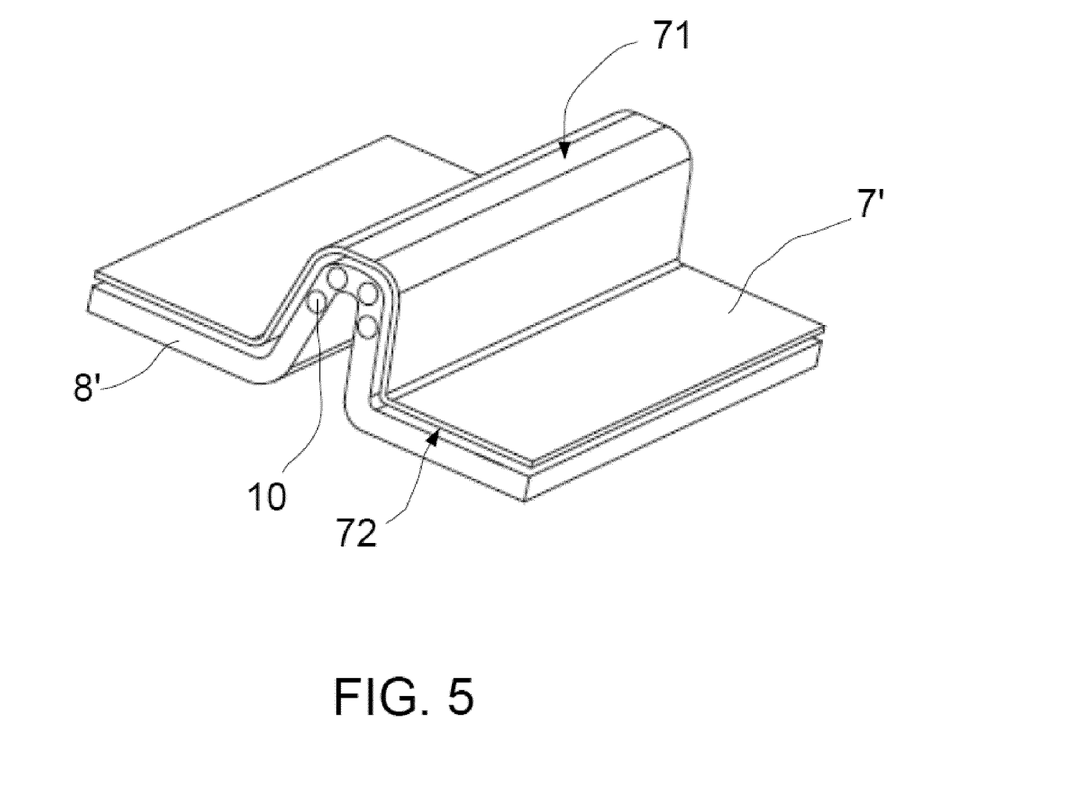
FIG. 5 shows another example of a structural component and cooling elements.

FIGS. 4 and 5 show alternative examples of cooling elements for a substantially U-shaped structural component 7'. The same reference signs have been used to designate matching elements. In these figures the reinforcement, the laser unit and powder nozzle (or filler wire or rod) have been deleted in order the more clearly show examples of the cooling elements.

In the example of FIG. 4, an air stream passage (arrow A) may be defined by the U-shape of the structural component 7'. Through this passage a cold airflow may be circulated for example using a ventilator, a fan or a compressor (as a compressed air source).

The example of FIG. 5 differs from that of FIG. 1 in that the tool working surface 8' may comprise a substantially U-shaped cross-section that follows the contour of the structural component 7' to be reinforced. As mentioned before, by providing a tool working surface substantially copying the shape of the structural component to be reinforced, additional support for the structural component may also be provided by the tool working surface thus avoiding or at least substantially reducing deformation of the component due to thermal stress. In the example of FIG. 5, four channels 10 have been depicted.

However, as explained in connection with FIG. 1 other number or channels (even a single channel) may be foreseen depending on the reinforcement zone to be applied to the component. The channels depicted in the examples of FIG. 2 or 3 may also be used in the example of FIG. 5. In the example of FIG. 5, the channels are shown extending in the longitudinal direction of the structural component however, in further examples the channels may extend transversally to the structural component or combinations thereof.

Figure 6A:
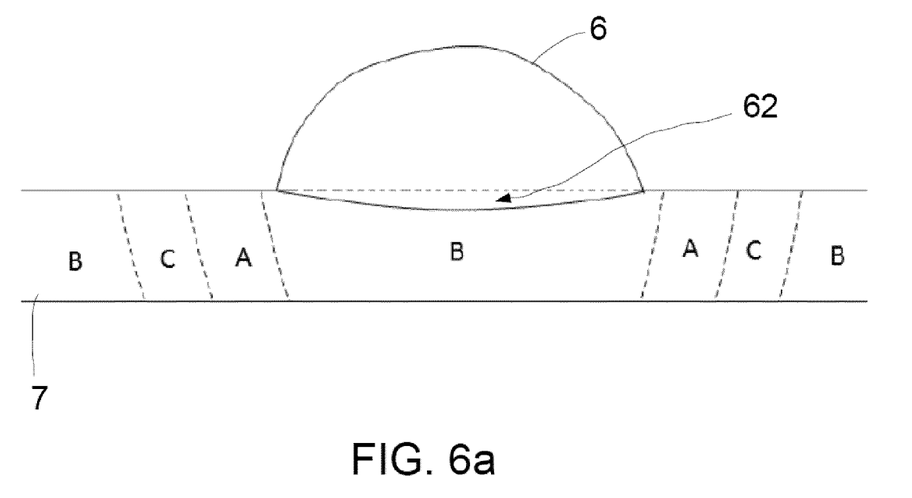
FIGS. 6a and 6b respectively show examples of the microstructure of a reinforced structural component obtained when reinforcements are applied to substantially thin and thick structural components without cooling as provided in the present disclosure.
Figure 6B:
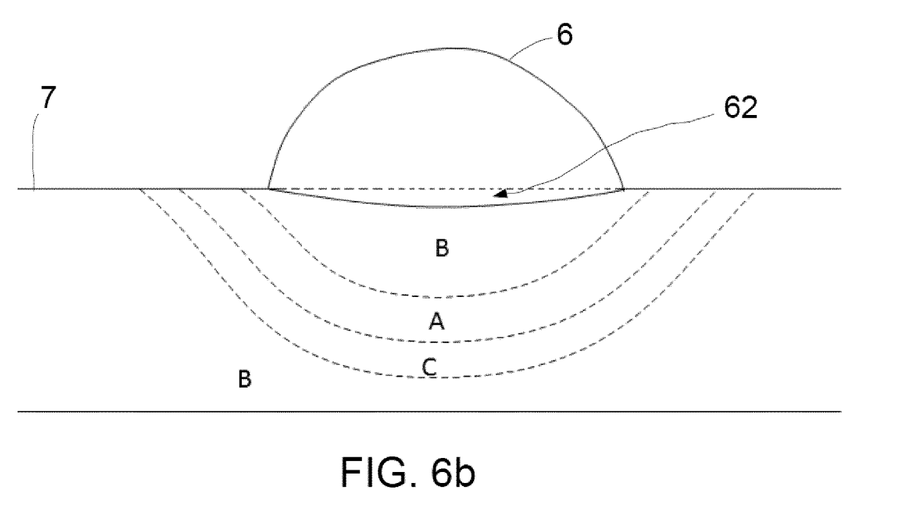

FIGS. 6a and 6b show examples of the microstructure of a reinforced structural component when prior art reinforcements are applied to structural components made of relatively thin (FIG. 6a) and relatively thick (FIG. 6b) material.

FIG. 6a shows an example of a previously formed structural component 7 made of a substantially thin blank, e.g. having a thickness lower than approximately 1.6 mm. The reinforcement 6 may be applied depositing a metal filler when laser heating is being applied. Arrow 62 shows a portion of filler that may be mixed with the outer surface of the component 7. In this example, the final reinforced structural component may comprise the resulting following microstructure: area B having a martensite microstructure, area A having mainly a bainite microstructure (with presence of ferrite perlite and martensite) and area C having a ferrite matrix microstructure (with presence of martensite and bainite and perlite).

The example of FIG. 6b differs from that of FIG. 6a in that the thickness of the previously formed structural component is higher. The same reference signs have been used to designate matching elements. The example of FIG. 6b further differs from that of FIG. 6a in the shape of the resulting microstructure obtained. However, in both examples, area C having a a ferrite matrix microstructure (with presence of martensite and bainite and perlite) is found. Notably, the HAZ in the case of the thicker component does not extend through the entire thickness of the component.

Figure 7:
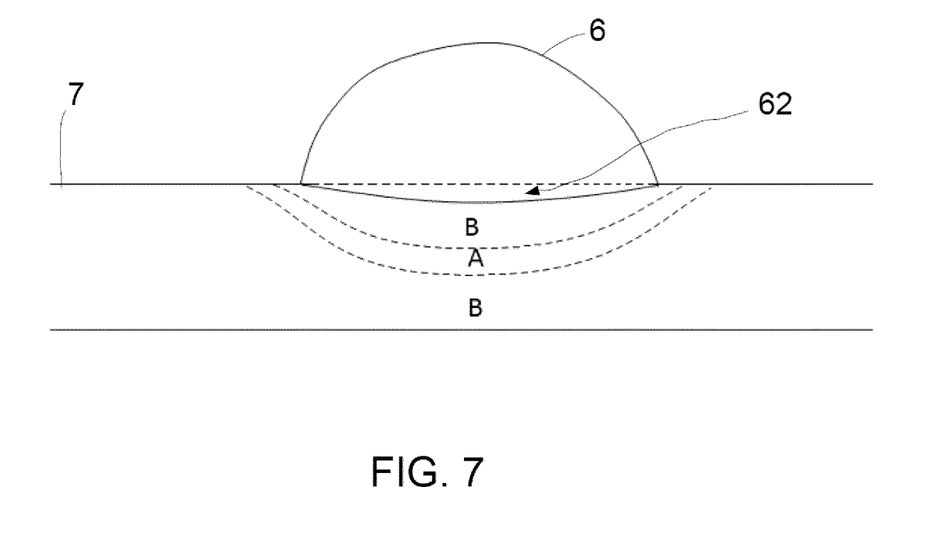
FIG. 7 shows an example of the microstructure of a reinforced structural component when a reinforcement is applied using tools and methods substantially as hereinbefore described.

The example of FIG. 7 shows a previously formed structural component in which a reinforcement has been applied using tools and methods substantially as hereinbefore described, i.e. applying cooling to HAZ areas while the reinforcement is being applied. In this example, the final reinforced structural component may have the following resulting microstructure: area B having a martensite microstructure (more than 400 Hv thus more than 1300 Mpa, preferable more than 450 Hv, i.e. more than 1450 Mpa) and area A having mainly a bainite microstructure (with presence of ferrite perlite and martensite, i.e. approximately 250-350 Hv, thus 800-1100 Mpa). This means that using the tools and methods described herein the areas of the reinforced structural component having a ferrite matrix microstructure have disappeared. In further examples, depending on circumstances, i.e. the thickness of the structural component, the laser heating or speed of laser exposure among other factors, the area A may be made smaller or it may even also disappear. This means that the final reinforced structural component has enhanced microstructure (hardness properties).

In general, the channels consist of a sealed tube or pipe of a material that is compatible with the cooling fluid to be circulated therethrough. The channels may be made from any suitable material able to conduct the cooling properties of the cold fluid circulating inside the channel. In some examples, the channels may be made of any metal or metal allow, e.g. steel or steel alloy. As explained in connection with FIG. 4, the channels may further be provided in combination with a vacuum pump or a compressor for circulation of cold airflow.

In an example, the formed component may be made by hot forming die quenching a boron steel blank that may be made coated or uncoated, such as e.g. Usibor®.

In addition, above-mentioned cooling elements are quite simple in construction, cost-effective and yet capable of efficiently achieving a desired cooling rate at the boundary areas abutting a reinforcement zone.

In more examples, a control system and temperature sensors (not shown) may be provided to control the temperature at heat-affected zones abutting the reinforcement zone. The sensors may be thermocouples. The thermocouples may be associated with a control panel. When more than one channel is provided, each channel (or cooling element) may thus be activated independently from the other. Thus using a suitable software or control logic, a user will be able to set the key parameters (temperature, temperature limits) based on which the cooling rate can be regulated to obtain a martensitic structure at the boundary areas abutting the reinforcements.

Although only a number of examples have been disclosed herein, other alternatives, modifications, uses and/or equivalents thereof are possible.

Furthermore, all possible combinations of the described examples are also covered. Thus, the scope of the present disclosure should not be limited by particular examples, but should be determined only by a fair reading of the claims that follow.

The invention claimed is:

1. A method for manufacturing reinforced steel structural components, the method comprising:

locally depositing a material on a reinforcement zone of a previously formed structural component to create a local reinforcement on a first side of the structural component, wherein locally depositing a material on the reinforcement zone comprises:
supplying a metal filler material to the reinforcement zone, and
simultaneously applying laser heat to melt the metal filler material;
drawing specific geometric shapes on the first side of the structural component with the metal filler material and the laser heating to create the local reinforcement; and
cooling areas on a second side of the structural component that is opposite to the first side, wherein cooling the areas comprises:
bringing a working surface of a tool in contact with the second side of the structural component; and
aligning a channel formed in the tool and configured to circulate cold fluid therethrough with heat-affected zones abutting the reinforcement zone.

2. The method of claim 1, wherein the structural component has a thickness in the range between 0.7 mm to 5 mm.

3. The method of claim 1, wherein the metal filler material comprises metal powder provided in a powder gas flow.

4. The method of claim 1, wherein the heat-affected zones abutting the reinforcement zone comprises areas abutting the reinforcement zone in at least one of a transversal direction or a longitudinal direction in at least one of a horizontal plane or a vertical plane.

5. The method of claim 1, wherein the previously formed steel structural component is made from boron steel.

6. The method of claim 1, wherein the previously formed structural component is obtained by hot forming die quenching.

7. The method of claim 1, wherein cooling areas on the second side of the structural component further comprises directing an air stream to the areas on the second side of the structural component from one or more air injectors or blowers.

8. The method of claim 1, further comprising determining a temperature of the heat-affected zones abutting the reinforcement zone, and cooling the areas on the second side of the structural component as a function of the temperature of the heat-affected zones.

9. The method of claim 1, wherein the previously formed steel structural component is formed from a blank having a single thickness.

10. The method of claim 3, wherein the metal powder comprises a stainless steel based powder.

11. A tool for manufacturing reinforced steel structural components, the tool comprising
one or more working surfaces that in use face the structural component to be reinforced, wherein the structural component comprises one or more reinforcement zones, and
the tool further comprising cooling elements configured to cool down at least portions of an opposite side of the working surface, the cooling elements being arranged such that in use they are aligned with heat-affected zones abutting the reinforcement zone such that a cooling rate of the heat-affected zones can be regulated to obtain a martensite microstructure at the heat-affected zones wherein the working surface comprises one or more portions having a substantially U-shaped cross-section.

12. The tool of claim 11, wherein the cooling elements comprise channels configured for circulation of a cold fluid.

13. A reinforced steel component as obtainable by any of the methods according to claim 1.

* * * * *